US012803219B2

(12) United States Patent
Nozaki et al.

(10) Patent No.: US 12,803,219 B2
(45) Date of Patent: Nov. 17, 2026

(54) CONNECTOR INCLUDING CONNECTION TERMINAL AND MOUNTING TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shinji Nozaki, Mie (JP); Hideto Nakamura, Mie (JP); Tetsuya Miyamura, Mie (JP); Daisuke Saito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 333 days.

(21) Appl. No.: 18/685,042

(22) PCT Filed: Aug. 19, 2022

(86) PCT No.: PCT/JP2022/031428
§ 371 (c)(1),
(2) Date: Feb. 20, 2024

(87) PCT Pub. No.: WO2023/026992
PCT Pub. Date: Mar. 2, 2023

(65) Prior Publication Data

US 2025/0385467 A1 Dec. 18, 2025

(30) Foreign Application Priority Data

Aug. 27, 2021 (JP) ................................ 2021-138568

(51) Int. Cl.
*H01R 13/629* (2006.01)
*H01R 13/04* (2006.01)
(Continued)

(52) U.S. Cl.
CPC .......... *H01R 13/629* (2013.01); *H01R 13/04* (2013.01); *H01R 13/10* (2013.01); *H01R 13/5045* (2013.01); *H01R 27/02* (2013.01)

(58) Field of Classification Search
CPC ...... H01R 13/629; H01R 13/04; H01R 13/10; H01R 13/5045; H01R 27/02; H01R 31/06;
(Continued)

(56) References Cited

U.S. PATENT DOCUMENTS 8,876,543 B2 * 11/2014 Oka .................. H01R 13/4223 439/353
9,787,023 B2 * 10/2017 Nakazawa ............ H01R 13/44
(Continued)

FOREIGN PATENT DOCUMENTS

JP 2005-149934 A 6/2005
JP 2006-108050 A 4/2006
(Continued)

OTHER PUBLICATIONS

International Search Report issued on Sep. 20, 2022 for WO 2023/026992 A1 (4 pages).

*Primary Examiner* — Edwin A. Leon
(74) *Attorney, Agent, or Firm* — Venjuris, P.C.

(57) ABSTRACT

It is aimed to provide a connector capable of improving a degree of freedom in designing a connection terminal. A connector (10) is provided with a housing (11), a connection terminal (12) to be arranged inside the housing (11) and a mounting terminal (13) to be mounted into the housing (11). The connection terminal (12) includes a tubular box portion
(Continued)

(28). The mounting terminal (13) includes a contact portion (48) to be electrically connected to the connection terminal (12) by contacting an outer surface of the box portion (28).

6 Claims, 8 Drawing Sheets

(51) Int. Cl.
*H01R 13/10* (2006.01)
*H01R 13/504* (2006.01)
*H01R 27/02* (2006.01)

(58) Field of Classification Search
CPC .............. H01R 13/113; H01R 13/4223; H01R 13/6272; H01R 31/08
See application file for complete search history.

(56) References Cited

U.S. PATENT DOCUMENTS

| | | | | |
|---|---|---|---|---|
| 2010/0105229 | A1* | 4/2010 | Ohsako | H01R 13/113 439/259 |
| 2011/0111640 | A1 | 5/2011 | Hara et al. | |

FOREIGN PATENT DOCUMENTS

| | | | |
|---|---|---|---|
| JP | 2008-204720 | A | 9/2008 |
| JP | 2013-254596 | A | 12/2013 |

* cited by examiner

CONNECTOR INCLUDING CONNECTION TERMINAL AND MOUNTING TERMINAL

CROSS REFERENCE TO RELATED APPLICATIONS

This application is a national phase of PCT application No. PCT/JP2022/031428, filed on 19 Aug. 2022, which claims priority from Japanese patent application No. 2021-138568, filed on 27 Aug. 2021, all of which are incorporated herein by reference.

TECHNICAL FIELD

The present disclosure relates to a connector.

BACKGROUND

Patent Document 1 discloses a housing for holding a busbar and another connector for accommodating a plurality of connection terminals. The housing includes a connector fitting chamber. The busbar includes branched terminal portions projecting into the connector fitting chamber. The other connector is fit into the connector fitting chamber of the housing. The connection terminal includes a tubular connecting portion (hereinafter, referred to as a "box portion") to be connected to the branched terminal portion. A contact piece to be contacted by the branched terminal portion is provided inside the box portion.

PRIOR ART DOCUMENT

Patent Document

Patent Document 1: JP 2005-149934 A

SUMMARY OF THE INVENTION

Problems to be Solved

In the case of Patent Document 1, the inside of the box portion is so shaped that the branched terminal portion can be positioned and inserted thereinto, and so designed that the contact piece is located to face the inserted branched terminal portion. Thus, the inside shape of the box portion is limited and, consequently, a degree of freedom in designing the connection terminal is limited.

Accordingly, the present disclosure aims to provide a connector capable of improving a degree of freedom in designing a connection terminal.

Means to Solve the Problem

The present disclosure is directed to a connector with a housing, a connection terminal to be arranged inside the housing and a mounting terminal to be mounted into the housing, the connection terminal including a tubular box portion, and the mounting terminal including a contact portion to be electrically connected to the connection terminal by contacting an outer surface of the box portion.

Effect of the Invention

According to the present disclosure, it is possible to provide a connector capable of improving a degree of freedom in designing a connection terminal.

DETAILED DESCRIPTION TO EXECUTE THE INVENTION

Description of Embodiments of Present Disclosure

Figure 1:
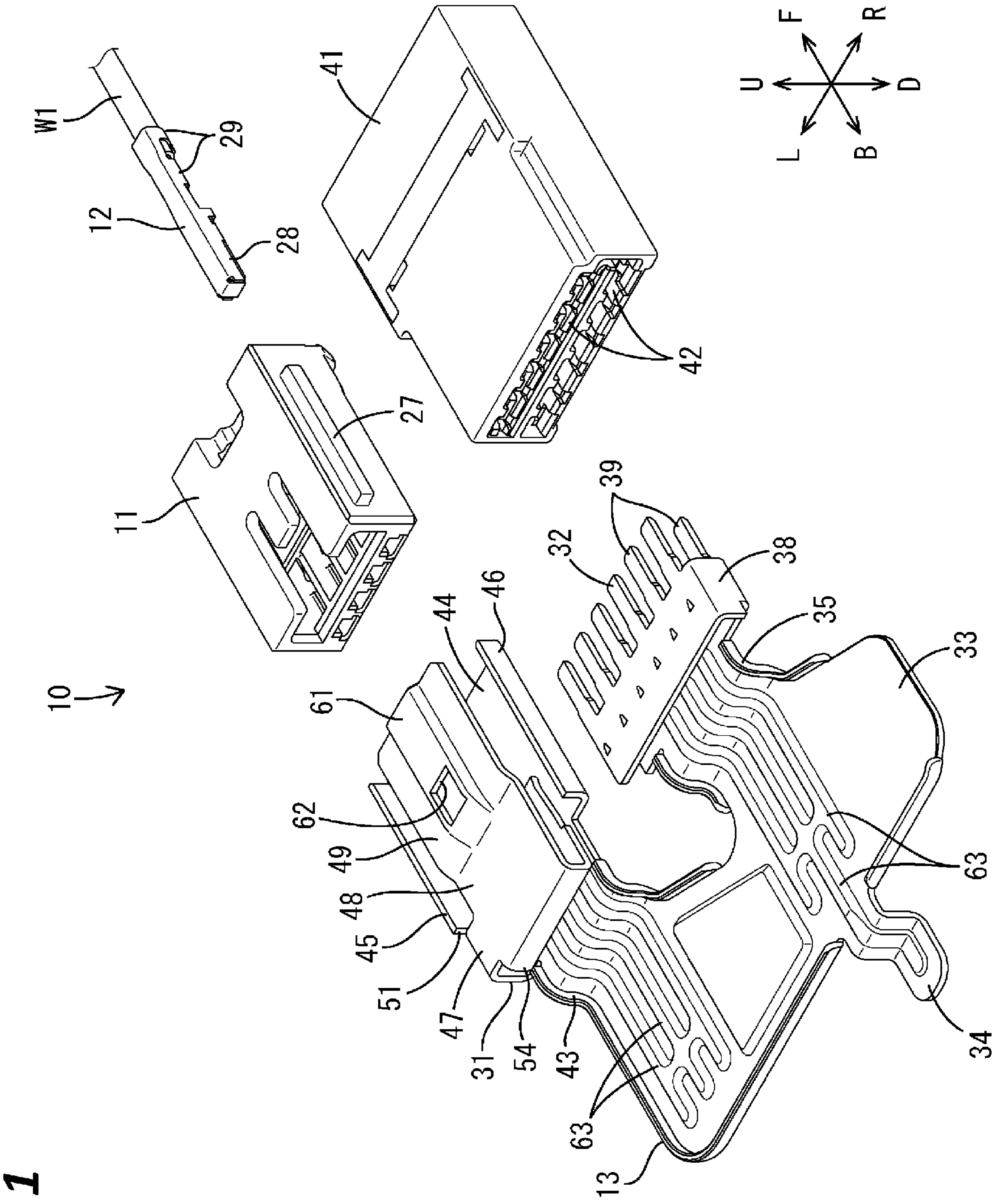
FIG. 1 is an exploded perspective view of a connector according to an embodiment of the present disclosure.

First, embodiments of the present disclosure are listed and described.

(1) The connector of the present disclosure is provided with a housing, a connection terminal to be arranged inside the housing and a mounting terminal to be mounted into the housing, the connection terminal including a tubular box portion, and the mounting terminal including a contact portion to be electrically connected to the connection terminal by contacting an outer surface of the box portion.

According to the above configuration, since the contact portion of the mounting terminal contacts the outer surface of the box portion of the connection terminal, the inside shape of the box portion can be freely designed without any limitation. As a result, a degree of freedom in designing the connection terminal can be improved. For example, a general-purpose female terminal can be used as the connection terminal. Alternatively, the connection terminal can have a simple structure including no contact piece inside the box portion.

(2) The contact portion may include a pair of sandwiching pieces for sandwiching the box portion.

According to the above configuration, a state of the contact portion in contact with the outer surface of the box portion can be satisfactorily maintained and connection reliability can be ensured.

(3) The contact portion may include a coupling portion coupling the pair of sandwiching pieces and the coupling portion may be formed to extend in a height direction if a sandwiching direction of the pair of sandwiching pieces to sandwich the box portion is the height direction.

According to the above configuration, the folded coupling portion can be easily formed, utilizing a height of the box portion.

(4) A locking lance for locking the connection terminal may be provided inside the housing, a mold removal hole open to enable visual confirmation of the locking lance may be provided in an end surface of the housing, and one of the pair of sandwiching pieces may be arranged inside the mold removal hole.

According to the above configuration, the mold removal hole formed due to the withdrawal of a mold for molding the locking lance can be utilized as a space for arranging the sandwiching piece inside the housing, the structure of the housing can be simplified.

Further, since a dedicated insertion opening for allowing the passage of the sandwiching piece needs not be provided in the end surface of the housing, the rigidity of the end surface of the housing can be easily ensured and the miniaturization of the housing can be coped with.

(5) The mounting terminal may include a flat plate-like holding portion continuous from the contact portion, and the housing may include a slit for positioning the holding portion.

According to the above configuration, a tubular guide such as a receptacle for guiding the fitting into the housing needs not be provided on the mounting terminal side. Alternatively, even if the tubular guide is provided, the mounting terminal can have a simple structure.

Details of Embodiment of Present Disclosure

A specific example of an embodiment of the present disclosure is described below with reference to the drawings. Note that the present invention is not limited to this illustration, but is represented by claims and intended to include all changes in the scope of claims and in the meaning and scope of equivalents.

A connector 10 provided in an electrically conductive path branched part of a vehicle is illustrated in this embodiment. The connector 10 is provided with a housing 11, a plurality of connection terminals 12 to be accommodated into the housing 11 and a mounting terminal 13 to be fit and mounted into the housing 11. In the case of this embodiment, the mounting terminal 13 is a ground terminal, electrically connected to the respective connection terminals 12 inside the housing 11 and electrically connected to a ground side such as an unillustrated vehicle body outside the housing 11. Note that, in the following description of a specific structure, a side of the mounting terminal 13 to be mounted into the housing 11 is referred to as a front side concerning a front-rear direction. A vertical direction is synonymous with a height direction and based on a vertical direction of each figure except FIG. 5. A lateral direction is synonymous with a width direction and based on a lateral direction of FIGS. 1 and 2. F, B, U, D, L and R in figures respectively represent front, rear, upper, lower, left and right sides. These directions are merely determined for the convenience of description and do not limit a mode during use.

Figure 2:
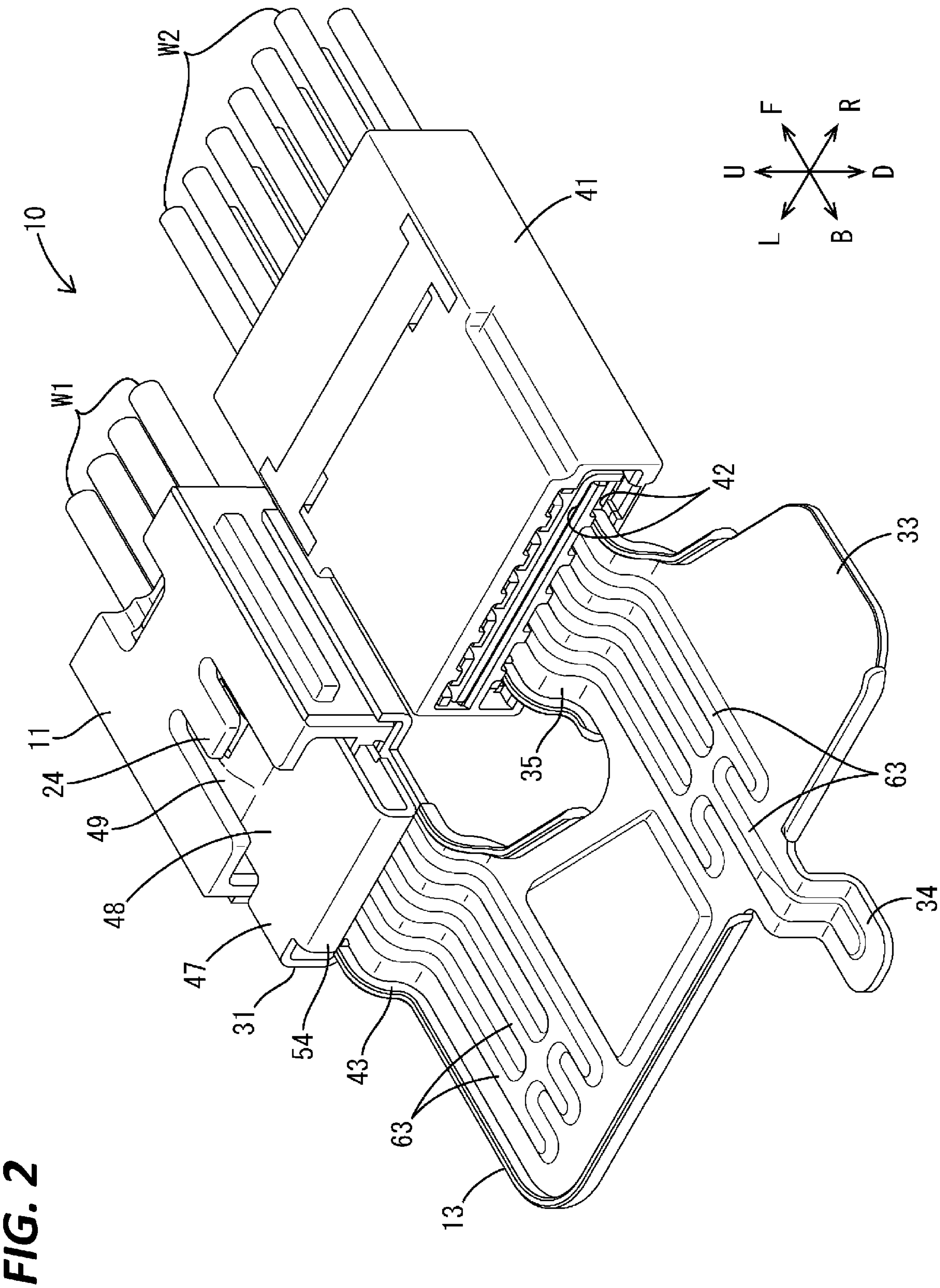
FIG. 2 is a perspective view of a connector in a fitting state.
Figure 6:
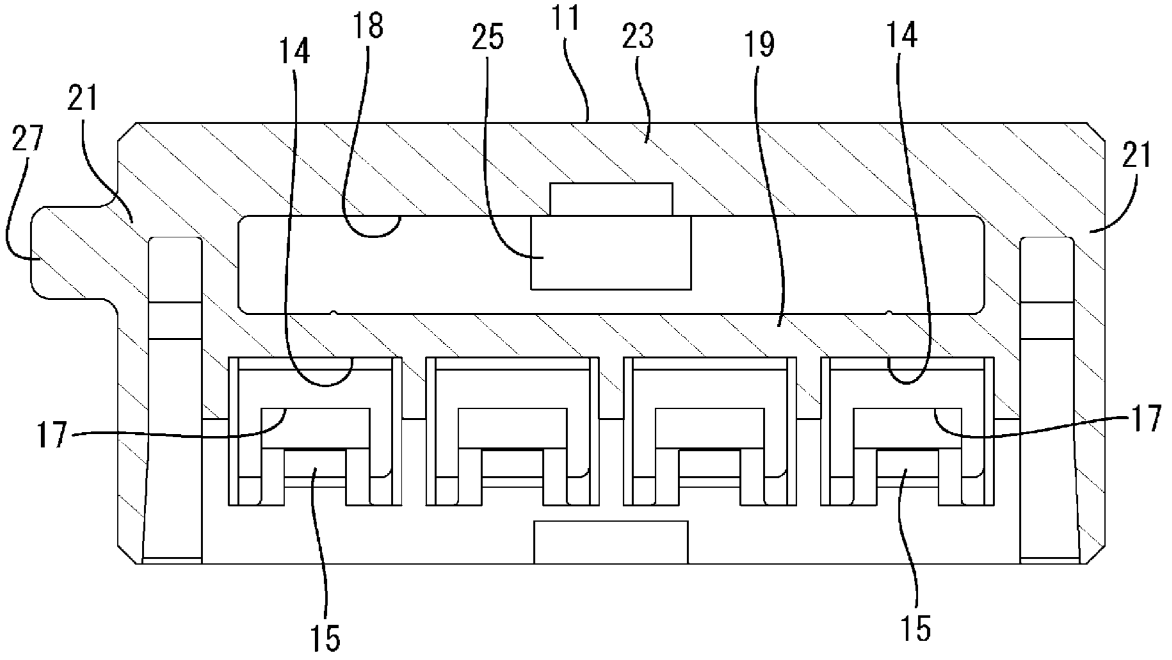
FIG. 6 is a section along A-A of FIG. 5.

The housing 11 is made of synthetic resin and has a flat shape rectangular in a plan view as a whole as shown in FIGS. 1 and 2. The housing 11 includes a plurality of cavities 14 as shown in FIG. 6. The respective cavities 14 are arranged laterally side by side in a row inside the housing 11.

Figure 3:
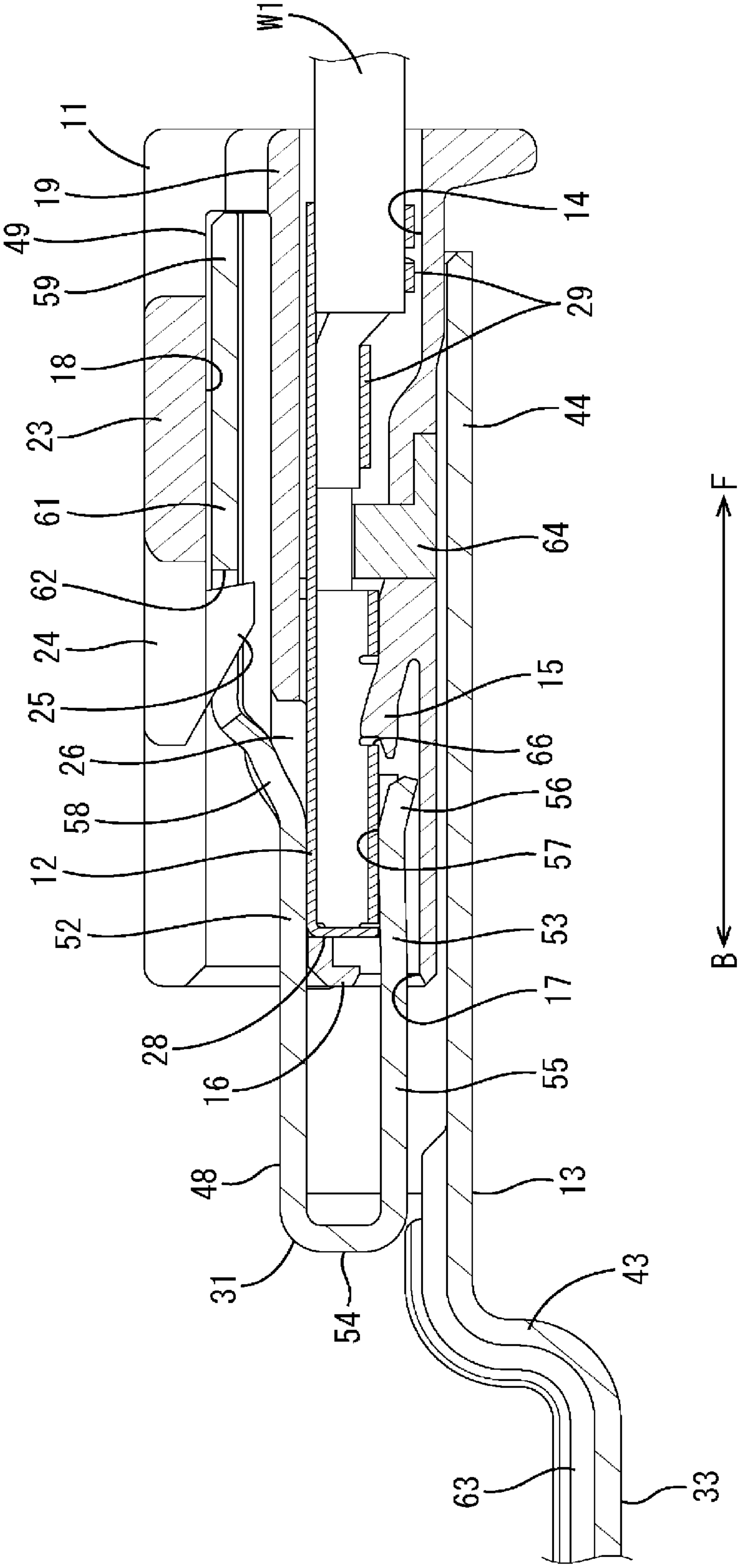
FIG. 3 is a side view in section showing a state where a contact portion of a mounting terminal is electrically connected to a connection terminal.
Figure 4:
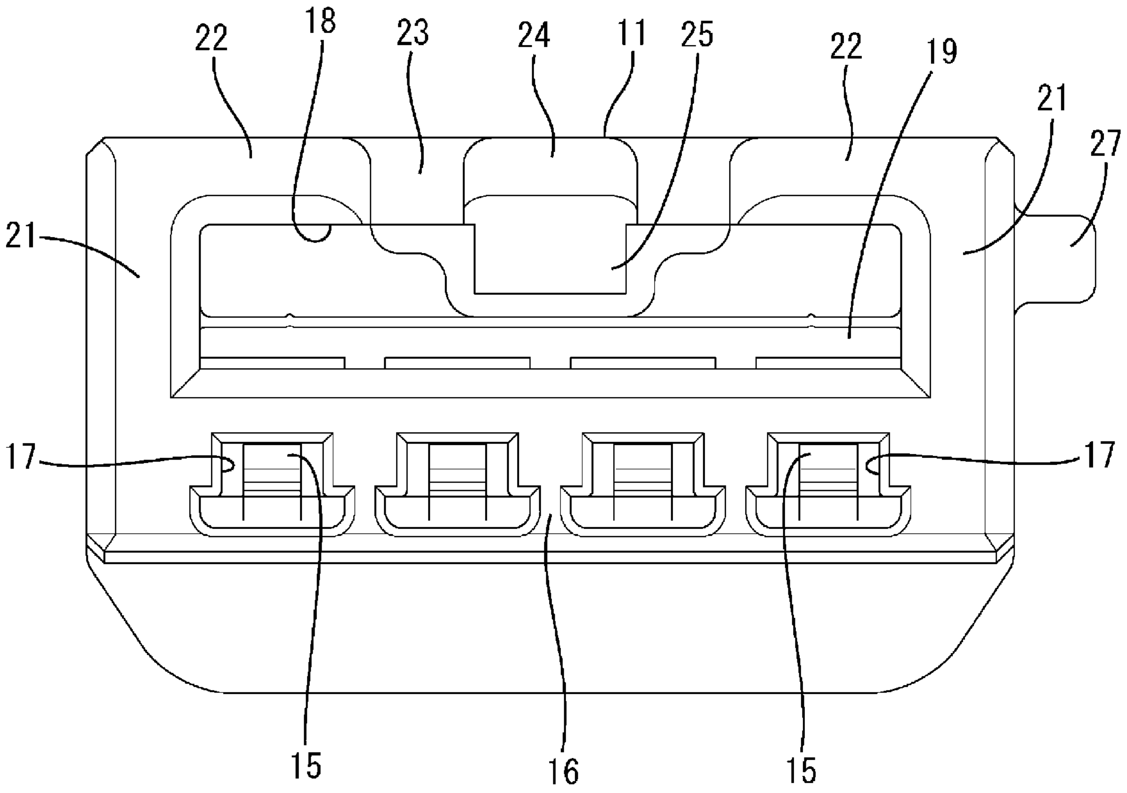
FIG. 4 is a back view of a housing.

The housing 11 includes a plurality of locking lances 15. Each locking lance 15 projects rearward from the lower surface of each cavity 14 as shown in FIG. 3 and is vertically resiliently deformable. As shown in FIG. 4, an end wall 16 is formed on the rear surface of the housing 11. A plurality of mold removal holes 17 penetrate through the end wall 16 due to the withdrawal of a mold for molding the respective locking lances 15. Each mold removal hole 17 is arranged to face each locking lance 15 from behind each locking lance 15. Each locking lance 15 can be visually confirmed from behind through each mold removal hole 17 as shown in FIG. 4. The rear surface of each cavity 14 is closed by the end wall 16 except at each mold removal hole 17.

Figure 5:
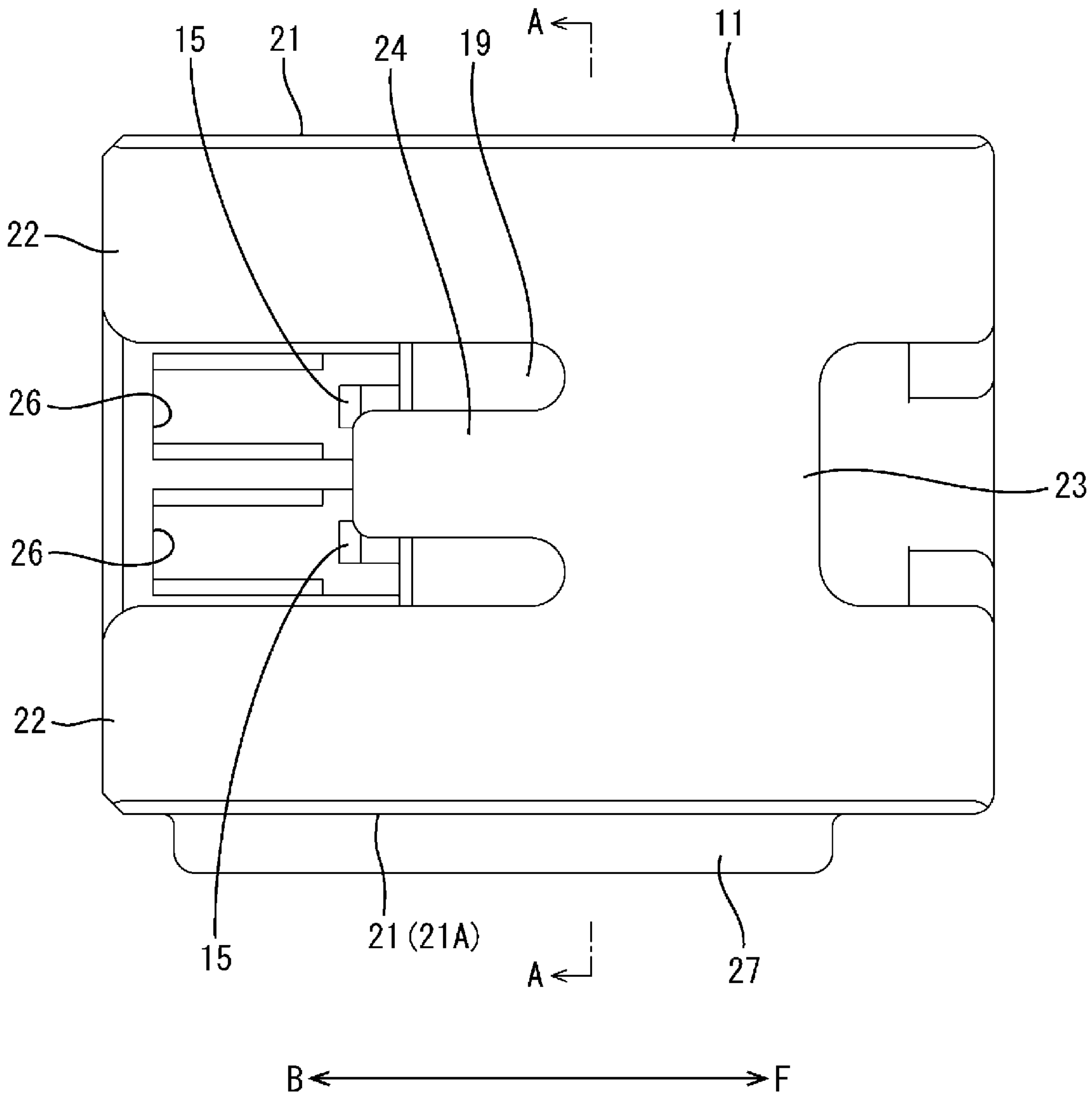
FIG. 5 is a plan view of the housing.

A slit 18 extending along the width direction is formed in an upper part of the housing 11. The slit 18 is open rearward of the housing 11. As shown in FIGS. 4 and 6, the lower surface of the slit 18 is closed by a closing wall 19. The closing wall 19 partitions between the slit 18 and the respective cavities 14. Both side surfaces of the slit 18 are closed by left and right side walls 21. As shown in FIGS. 4 and 5, the upper surface of the slit 18 is closed by the left and right guide walls 22, a bridge wall 23 and a lock portion 24. The guide walls 22 protrude inward in the width direction from upper parts of the side walls 21. The bridge wall 23 is bridged between front parts of the left and right guide walls 22. The lock portion 24 projects rearward from a lateral central part of the bridge wall 23. The respective upper surfaces of the guide walls 22, the bridge wall 23 and the lock portion 24 are planarly arranged without any step. As shown in FIGS. 3 and 4, a claw-like locking projection 25 is formed to project downward on a tip part of the lock portion 24.

As shown in FIG. 5, a plurality of openings 26 are formed to penetrate behind the closing wall 19 in the upper part of the housing 11. Each opening 26 is open to have a rectangular plan view shape for each cavity 14 and communicates with each cavity 14 in the upper part of the housing 11. The housing 11 includes a rib 27 extending in the front-rear direction on one side wall 21, out of the both side walls 21.

The connection terminal 12 is formed of an electrically conductive metal plate. As shown in FIGS. 1 and 3, the connection terminal 12 includes a box portion 28 and a barrel portion 29 in the form of an open barrel connected in front of the box portion 28. The barrel portion 29 is crimped and connected to an end part of a wire W1. The box portion 28 is in the form of a rectangular tube having a closed rear surface and has a hollow structure in which a contact piece or the like is not formed. As shown in FIG. 3, a lance hole 66 is formed to penetrate through the lower wall of the box portion 28.

The mounting terminal 13 is likewise formed of an electrically conductive metal plate. As shown in FIG. 1, the mounting terminal 13 includes a body portion 31, a branched portion 32 and a base portion 33. The base portion 33 is in the form of a flat plate extending along the front-rear direction and lateral direction, and includes a mounting piece 34 bent rearward on a rear edge. The mounting piece 34 is fixed to the ground side such as a vehicle body.

Figure 7:
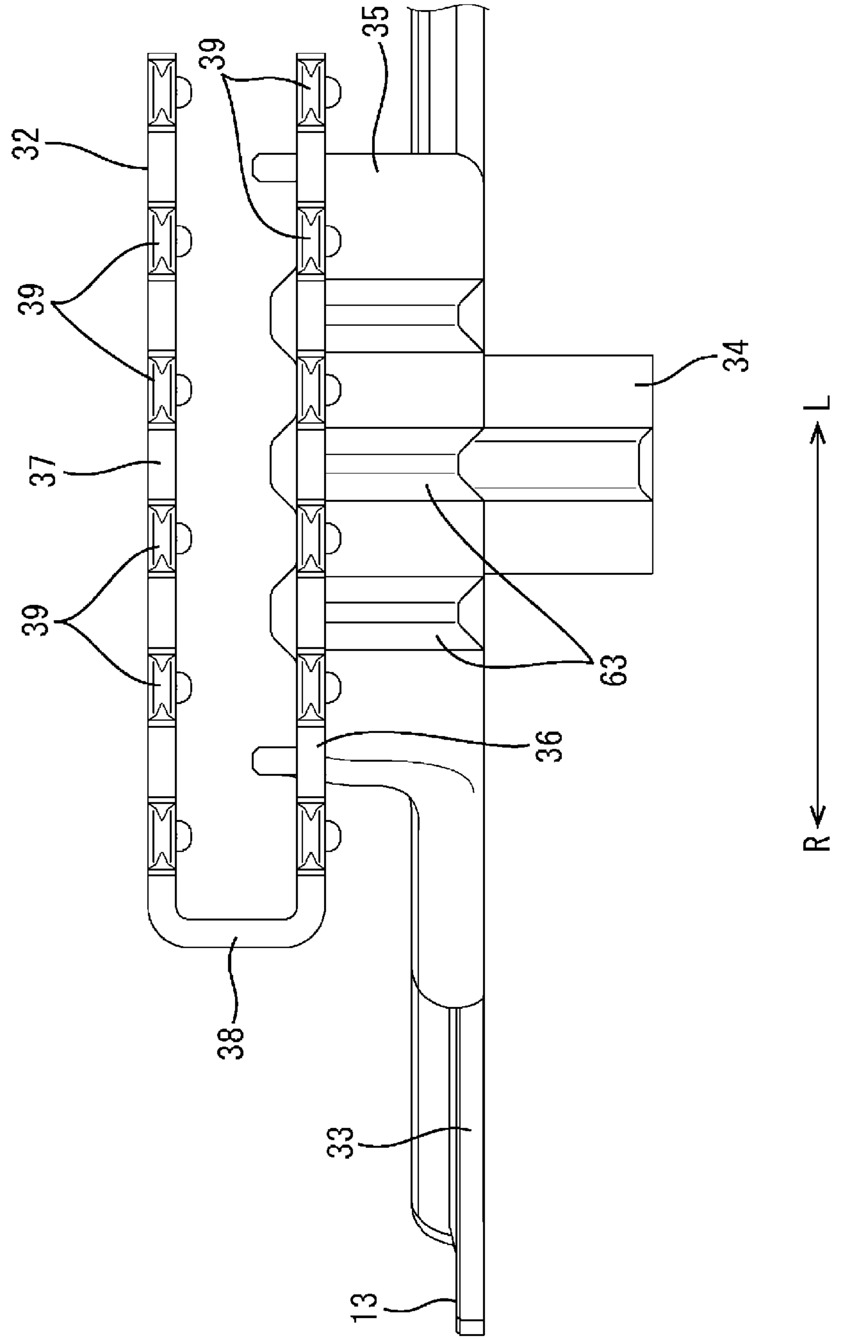
FIG. 7 is a front view of a branched portion side of the mounting terminal.

The branched portion 32 and the body portion 31 are arranged laterally side by side via the base portion 33. As shown in FIG. 7, the branched portion 32 includes a base end portion 35, a lower plate portion 36, an upper plate portion 37, a side plate portion 38 and a plurality of connection pieces 39. The base end portion 35 is in the form of a plate rising from a right side of FIG. 1 on the front edge of the base portion 33. The lower plate portion 36 is in the form of a flat plate and includes parts projecting forward from an upper part of the base end portion 35 and protruding toward both left and right sides. The upper plate portion 37 is also in the form of a flat plate and facing in parallel to the lower plate portion 36 above the lower plate portion 36. The side plate portion 38 is coupled to the right side edge of each of the upper plate portion 37 and the lower plate portion 36.

The plurality of connection pieces 39 are in the form of tabs and project forward from the front edge of each of the upper plate portion 37 and the lower plate portion 36. The respective connection pieces 39 are arranged laterally side by side on the front edge of each of the upper plate portion 37 and the lower plate portion 36.

As shown in FIGS. 1 and 2, a female housing 41 is fit to the branched portion 32 from front. The female housing 41 is made of synthetic resin, has a flat shape rectangular in a plan view, and is one size larger than the housing 11.

A pair of upper and lower mounting grooves 42 are open in the rear surface of the female housing 41. The upper plate portion 37 and the lower plate portion 36 are respectively inserted into the pair of upper and lower mounting grooves 42 from behind. Further, a plurality of unillustrated female terminal fittings are inserted into the female housing 41 from front. The respective female terminal fittings are facing the pair of upper and lower mounting grooves 42, have the respective connection pieces 39 inserted thereinto and are electrically connected to the branched portion 32. Further, the female terminal fittings are respectively electrically connected to end parts of wires W2. As shown in FIG. 2, the respective wires W2 are pulled out forward from the front surface of the female housing 41.

Figure 8:
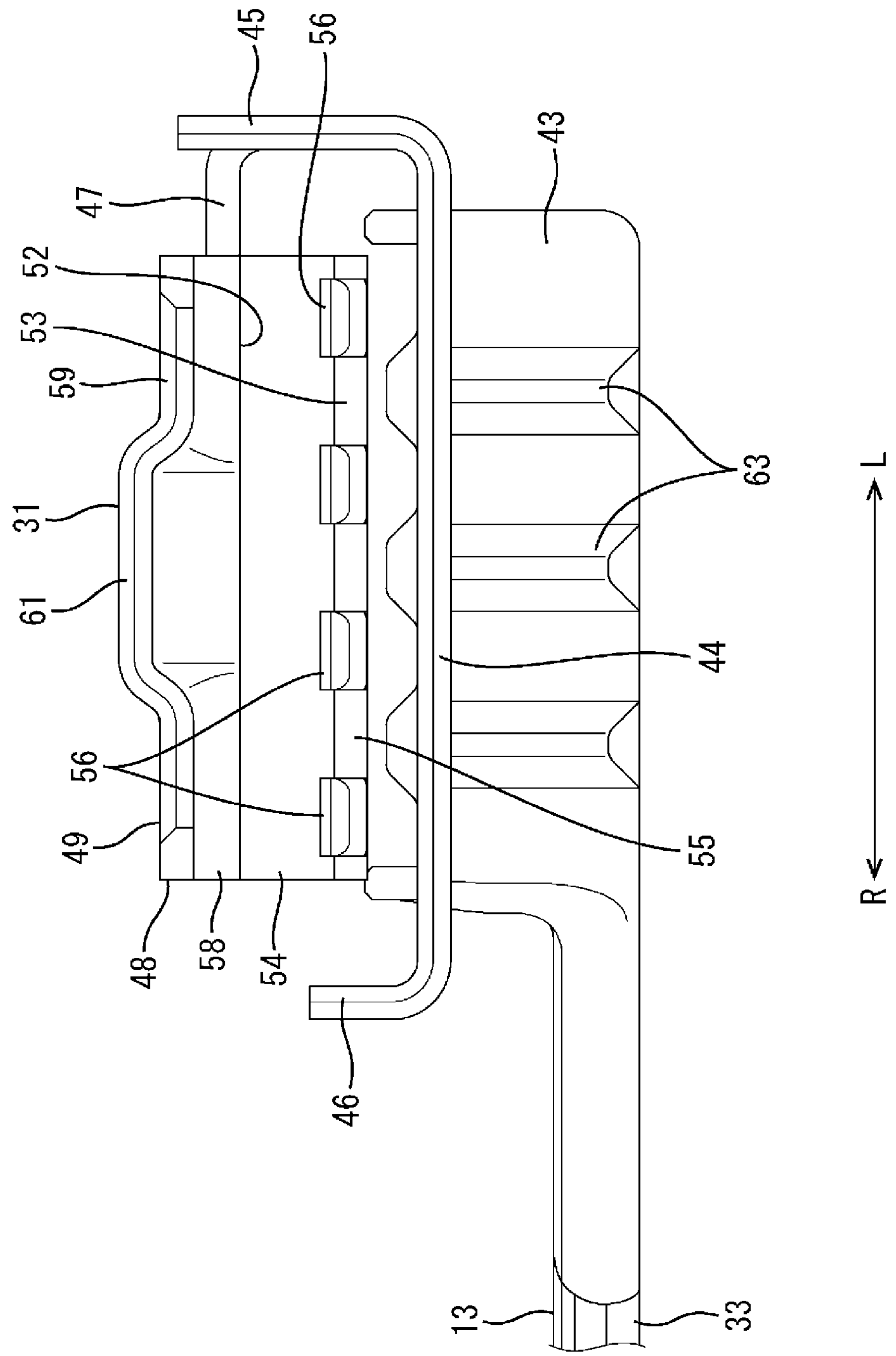
FIG. 8 is a front view of a body portion side of the mounting terminal.

As shown in FIGS. 1 and 8, the body portion 31 includes a basis portion 43, a bottom plate portion 44, a one-side plate portion 45, an other-side plate portion 46, a linking portion 47, a contact portion 48 and a holding portion 49.

The basis portion 43 is in the form of a plate rising from a left side of FIG. 1 on the front edge of the base portion 33. The bottom plate portion 44 is in the form of a flat plate having a rectangular plan view shape and includes parts projecting forward from an upper part of the basis portion 43 and protruding toward both left and right sides. The bottom plate portion 44 is arranged higher than the base portion 33 via the basis portion 43.

The one-side plate portion 45 is in the form of a plate shaped to rise from a left side of FIG. 1 in the bottom plate portion 44 and extending along the vertical direction and lateral direction. As shown in FIG. 1, a step 51 is formed in the vertical direction on the upper edge of the one-side plate portion 45. Out of the upper edge of the one-side plate portion 45, a rear upper edge behind the step 51 is arranged to be lower than a front upper edge in front of the step 51.

The other-side plate portion 46 is in the form of a plate shaped to rise from a right side of FIG. 1 in the bottom plate portion 44 and extending along the vertical direction and lateral direction. The other-side plate portion 46 is formed to have a lower height than the one-side plate portion 45.

The linking portion 47 is shaped to be bent and extend from the rear upper edge of the one-side plate portion 45 toward the other-side plate portion 46 (right side of FIG. 1). The linking portion 47 is interposed between the one-side plate portion 45 and the contact portion 48 to link the both.

As shown in FIGS. 3 and 8, the contact portion 48 includes upper and lower sandwiching pieces 52 and a coupling portion 54 coupling the respective sandwiching pieces 52, 53. As shown in FIG. 8, the upper sandwiching piece 52 continuously extends from the linking portion 47 toward the other-side plate portion 46 and has an other side edge at a position retracted toward one side from the other-side plate portion 46. The upper sandwiching piece 52 is in the form of a flat plate extending along the lateral direction and front-rear direction and has a part protruding forward from the linking portion 47. The upper sandwiching piece 52 has such rigidity to be resiliently undeformable.

The lower sandwiching piece 53 is arranged to face the upper sandwiching piece 52 from below. The lower sandwiching piece 53 includes a strip plate portion 55 extending along the lateral direction and a plurality of resilient contact portions 56 projecting forward from the front edge of the strip plate portion 55. The respective resilient contact portions 56 are arranged laterally side by side on the front edge of the strip plate portion 55. Each resilient contact portion 56 is resiliently deformable in the vertical direction with the front edge of the strip plate portion 55 as a fulcrum. When being in a natural state without being resiliently deformed, each resilient contact portion 56 is inclined upward toward the front from the front edge of the strip plate portion 55 and a tip side thereof is bent downward from a contact point portion 57 located on an upper end.

As shown in FIG. 3, the coupling portion 54 extends in the vertical direction as a whole between rear parts of the respective sandwiching pieces 52 and 53 and is folded into a U shape. A width of the coupling portion 54 is equal to that of each of the sandwiching pieces 52, 53 as shown in FIG. 8. An extension length (vertical dimension) of the coupling portion 54 is equal to a separation distance in the vertical direction between the respective sandwiching pieces 52 and 53 and corresponds to a vertical dimension of the box portion 28 of the connection terminal 12.

As shown in FIGS. 3 and 8, the holding portion 49 includes a relay portion 58 inclined upward toward the front from the upper sandwiching piece 52 and a holding body portion 59 arranged along the front-rear direction to extend forward from the front end of the relay portion 58. The holding portion 49 includes a bulging portion 61 extending in the front-rear direction from the relay portion 58 to the holding body portion 59 in a lateral central part. As shown in FIG. 8, the bulging portion 61 is bent into a trapezoidal shape in a front view and the upper wall thereof is arranged to be flat. A lock hole 61 having a rectangular plan view shape is formed to be open in the upper wall of the bulging portion 61 as shown in FIG. 1.

As shown in FIG. 3, the holding body portion 59 is fit into the slit 18 of the housing 11. With the holding body portion 59 fit in the slit 18, the locking projection 25 of the lock portion 24 is lockably fit into the lock hole 62 of the bulging portion 61. Note that a plurality of ridge portions 63 are provided laterally side by side on a part from one side (left side of FIG. 1) of the base portion 33 to a rear part of the bottom plate portion 44 and a part from the other side (right side of FIG. 1) of the base portion 33 to a rear part of the lower plate portion 36.

Next, a fitting structure and functions of this embodiment are described.

As shown in FIG. 2, the female housing 41 is fit to the branched portion 32 of the mounting terminal 13. The respective connection pieces 39 of the branched portion 32 are electrically connected to the respective female terminal fittings.

The connection terminal 12 is inserted into each cavity 14 of the housing 11. As shown in FIG. 3, the connection terminal 12 is primarily retained in the cavity 14 by being locked by the locking lance 15 fit into the lance hole 66. Further, the connection terminal 12 is secondarily retained in the cavity 14 by being locked by a retainer 64 mounted into the housing 11. The rear surface, which is a closed surface, of the box portion 28 of the connection terminal 12 is stopped in contact with the end wall 16 of the housing 11, and the upper surface of the box portion 28 is exposed upward through the opening 26.

As shown in FIG. 2, the housing 11 is fit to the body portion 31 of the mounting terminal 13. Note that the respective resilient contact portions 56 of the body portion 31 are covered from above by the upper sandwiching piece 52 and the holding portion 49, covered from below by the bottom plate portion 44 and covered from both left and right sides by the one-side plate portion 45 and the other-side plate portion 46 before the housing 11 is fit. That is, the respective resilient contact portions 56 are protected on four sides before the housing 11 is fit.

In the process of fitting the body portion 31 into the housing 11, the holding body portion 59 is fit into an inner space surrounded by the closing wall 19, the left and right side walls 21 and the guide wall 22 of the housing 11 and a fitting operation of the body portion 31 is guided. The lock portion 24 of the housing 11 slides on the upper surface of the upper wall of the bulging portion 61 to be resiliently deformed in the fitting process.

If the body portion 31 is properly fit into the housing 11, the lock portion 24 resiliently returns and, as shown in FIG. 3, the locking projection 25 is fit into the lock hole 62. In this way, the mounting terminal 13 is held in a state fit in the housing 11. Further, if the body portion 31 is properly fit into the housing 11, the relay portion 58 faces the rear edge of the closing wall 19 and the holding body portion 59 is arranged in a state positioned between the bridge wall 23 and the closing wall 19 in the slit 18. The housing 11 is supported on the bottom plate portion 44 and sandwiched in the width direction between the one-side plate portion 45 and the other-side plate portion 46.

Further, as shown in FIG. 3, the upper sandwiching piece 52 covers rear openings of the respective cavities 14 and contacts the upper surfaces of the box portions 28 of the respective connection terminals 12 through the openings 26 with the body portion 31 properly fit in the housing 11. Further, the respective resilient contact portions 56 of the lower sandwiching piece 53 are located in the cavities 14 through the respective mold removal holes 17 and bring the respective contact point portions 57 into contact with the lower surfaces of the box portions 28 of the respective connection terminals 12. The respective resilient contact portions 56 are resiliently deformed by contacting the box portions 28. In this way, the contact portion 48 of the mounting terminal 13 contacts the outer surfaces of the box portions 28 and are electrically connected to the connection terminals 12 while sandwiching the box portions 28 between the respective sandwiching pieces 52 and 53.

As described above, since the contact portion 48 of the mounting terminal 13 contacts the outer surface of the box portion 28 of the connection terminals 12 according to this embodiment, the inside shape of the box portion 28 can be freely designed without any limitation. As a result, a degree of freedom in designing the connection terminal 12 can be improved. In the case of this embodiment, the connection terminal 12 has a simple shape including no contact piece inside the box portion 28. Thus, cost can be reduced.

Further, since the respective sandwiching pieces 52, 53 contact the box portions 28 while sandwiching the box portions 28, a connected state of the mounting terminal 13 and the connection terminals 12 can be maintained, for example, even under vibration and connection reliability can be improved.

Further, since the coupling portion 54 extends in the height direction, which is a sandwiching direction of the respective sandwiching pieces 52, 53 to sandwich the box portions 28, the folded shape of the coupling portion 54 can be naturally and easily formed, utilizing heights of the box portions 28.

Further, since the mold removal holes 17 formed in the end wall 16 of the housing 11 as the locking lances 15 are molded serve as insertion openings for allowing the passage of the lower sandwiching piece 53, dedicated insertion openings need not be provided in the end wall 16. As a result, the rigidity of the end wall 16 of the housing 11 can be easily ensured and the miniaturization of the housing 11 can be coped with.

Further, since the holding portion 49 of the mounting terminal 13 is positioned and held in the slit 18 of the housing 11 and the mounting terminal 13 is not provided with a tubular guide such as a receptacle for guiding the fitting into the housing 11, the mounting terminal 13 can have a simple structure.

Other Embodiments of Present Disclosure

The embodiment disclosed this time should be considered illustrative in all aspects, rather than restrictive.

In the case of the above embodiment, the connection terminal includes the box portion having a hollow structure. However, as another embodiment, the connection terminal may be a general-purpose female terminal fitting including a contact piece or the like in a box portion.

In the case of the above embodiment, the mounting terminal is not provided with a tubular guide for guiding the fitting operation into the housing. However, as another embodiment, the mounting terminal may be provided with a tubular guide. Of course, if the holding portion can exhibit a guiding function by being positioned in the slit, the tubular guide can have a simple structure.

In the case of the above embodiment, the contact portion of the mounting terminal is structured to sandwich the box portions between the upper sandwiching piece and the resilient contact portions. However, as another embodiment, the contact portion of the mounting terminal may be structured such that only the resilient contact portions contact the box portions without including the upper sandwiching piece.

In the case of the above embodiment, the resilient contact portion of the mounting terminal is provided for each connection terminal to individually contact the box portion of each connection terminal. However, as another embodiment, the resilient contact portion of the mounting terminal may be provided to correspond to the plurality of connection terminals so that the resilient contact portion collectively contacts the box portions of the plurality of connection terminals.

LIST OF REFERENCE NUMERALS

| | |
|---|---|
| 10 | connector |
| 11 | housing |
| 12 | connection terminal |
| 13 | mounting terminal |
| 14 | cavity |
| 15 | locking lance |
| 16 | end wall |
| 17 | mold removal hole |
| 18 | slit |
| 19 | closing wall |
| 21 | side wall |
| 21A | one side wall |
| 22 | guide wall |
| 23 | bridge wall |
| 24 | lock portion |
| 25 | locking projection |
| 26 | opening |
| 27 | rib |
| 28 | box portion |
| 29 | barrel portion |
| 31 | body portion |
| 32 | branched portion |
| 33 | base portion |
| 34 | mounting piece |
| 35 | base end portion |
| 36 | lower plate portion |
| 37 | upper plate portion |
| 38 | side plate portion |
| 39 | connection piece |
| 41 | female housing |
| 42 | mounting groove |

-continued

| | |
|---|---|
| 43 | basis portion |
| 44 | bottom plate portion |
| 45 | one-side plate portion |
| 46 | other-side plate portion |
| 47 | linking portion |
| 48 | contact portion |
| 49 | holding portion |
| 51 | step |
| 52 | upper sandwiching piece |
| 53 | lower sandwiching piece |
| 54 | coupling portion |
| 55 | strip plate portion |
| 56 | resilient contact portion |
| 57 | contact point portion |
| 58 | relay portion |
| 59 | holding body portion |
| 61 | bulging portion |
| 62 | lock hole |
| 63 | ridge portion |
| 64 | retainer |
| 66 | lance hole |
| W1, W2 | wire |

What is claimed is:

1. A connector, comprising:

a housing;

a connection terminal to be arranged inside the housing; and a mounting terminal to be mounted into the housing, the connection terminal including a tubular box portion, and the mounting terminal including a contact portion to be electrically connected to the connection terminal, wherein the contact portion includes a pair of sandwiching pieces configured to sandwich the box portion by contacting an outer surface of the box portion, and a locking lance configured to lock the box portion is provided inside the housing.

2. The connector of claim 1, wherein the contact portion includes a coupling portion coupling the pair of sandwiching pieces and the coupling portion is formed to extend in a height direction if a sandwiching direction of the pair of sandwiching pieces to sandwich the box portion is the height direction.

3. The connector of claim 1, wherein:

a mold removal hole open to enable visual confirmation of the locking lance is provided in an end surface of the housing, and one of the pair of sandwiching pieces is arranged inside the mold removal hole.

4. The connector of claim 1, wherein:

the mounting terminal includes a flat plate-like holding portion continuous from the contact portion, and the housing includes a slit for positioning the holding portion.

5. The connector of claim 3, wherein the mold removal hole is formed through an end wall defining the end surface of the housing, and a portion of the end wall is between the pair of sandwiching pieces.

6. The connector of claim 1, wherein the contact portion includes a coupling portion coupling the pair of sandwiching pieces, and a portion of the sandwiching pieces in contact with the outer surface of the box portion is between the coupling portion and the locking lance.

* * * * *